July 30, 1940.  E. T. CARLSON  2,209,560
POWER DISTRIBUTION
Filed Oct. 19, 1938
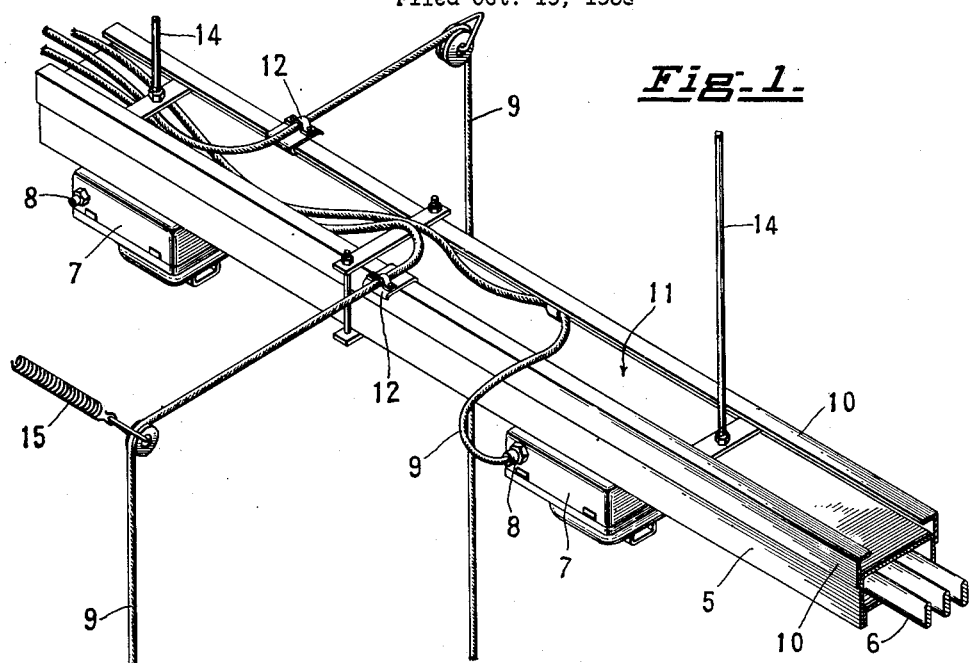
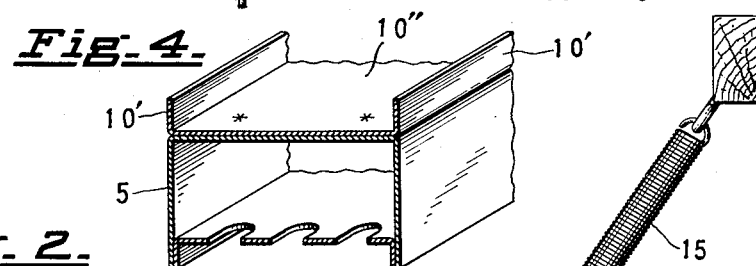
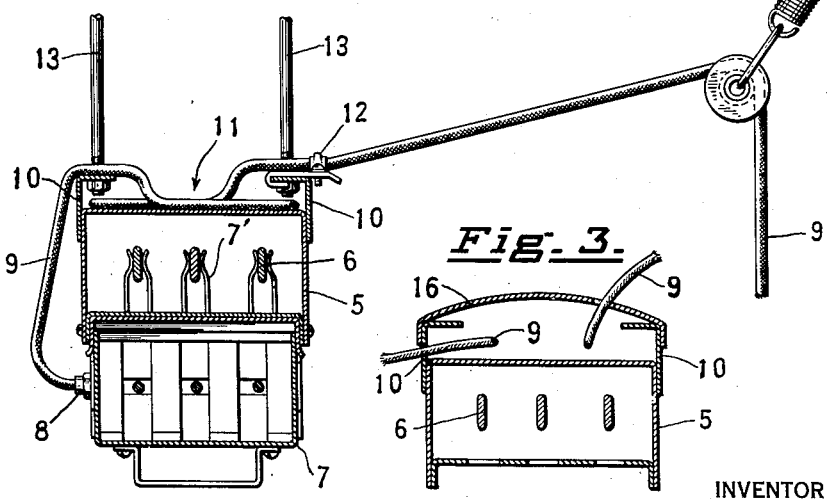
INVENTOR
ELMER T. CARLSON,
BY
ATTORNEY Patented July 30, 1940

2,209,560

UNITED STATES PATENT OFFICE 2,209,560

POWER DISTRIBUTION

Elmer T. Carlson, Fort Mitchell, Ky., assignor to The Trumbull Electric Manufacturing Company, a corporation of Connecticut Application October 19, 1938, Serial No. 235,771

7 Claims. (Cl. 173—334.1)

My invention relates especially to what are sometimes called bus bar conduit systems used largely in industrial plants for supplying power to various local machines and devices. In these systems, the main power line involves bus bars in a conduit or duct-like housing extending about the plant and provided with branch circuit connection devices and switches with flexible cables tapped off at various points convenient to the machines where power is required. In order to provide a maximum flexibility or convenience for the various requirements which are frequently changed at short notice, it is desirable to provide branch cables of considerable length so that at times there may be many feet of cable not in use and unnecessary for a particular location.

It is an object therefore of my invention to provide means for conveniently storing or housing a considerable number of lengths of cables which may be unnecessary at one time but hurriedly needed at another time. This I accomplish by providing a channel for storing the "spare" cable and supporting and protecting it on the bus bar duct.

Another object is to conveniently and effectively store and support the flexible cable just above where it is required so as to avoid tangling the cable and at the same time prevent damage due to pulls on the cable.

Another object is to reinforce the main bus bar conduit and reduce the necessary number of supports.

Another object is to provide convenient means for hanging the conduit from the girders and overhead structures of the plant.

Fig. 1 is a perspective view on a small scale of an installation involving one form of my invention.

Fig. 2 is a cross sectional view of the improved housing or duct with a branch circuit connection and cable.

Fig. 3 is a sectional view of the bus bar duct showing a cover for the cable-way.

Fig. 4 shows a modified form of a cable channel.

The bus bar duct or housing 5 may be of any suitable type and enclose the bus bars 6 which are insulated from each other in any suitable manner. Branch boxes or connectors 7 are usually employed to control the branch circuits. These connectors are provided with branch terminals, jaws or stabs 7' for engaging the bus bars and outlets 8 for the branch cables 9 which lead to the points where the power is required.

The upper side of the duct 5 is provided with angle irons 10 secured suitably either by bolts, screws or welding to the main duct and having flanges which are turned inwardly so as to form a channel 11 in which the spare lengths of the cable may be placed. These angle irons greatly reinforce the main bus bar duct and provide very convenient means for attaching clips 12 for anchoring the cable to the structure. They also provide convenient means for connecting rods such as 13 and 14 for supporting the bus bar duct and the cable protector flanges.

I also preferably provide lateral hangers 15 in the form of springs to resiliently carry the weight of the cable which hangs down near the machine where power is required.

When the cable is to be moved, it is merely necessary to loosen a clamp or clip 12 and let out or take up a length of cable and possibly move the clamp to a new position and reclamp it,—of course moving the spring support 15 when necessary.

This invention makes it possible to store a number of extra cable lengths in the cable channel for hurriedly extending a cable which is already connected to the most convenient connection device and each extra cable is usually provided at each of its ends with plug connectors of some form so that, in some instances, it is merely necessary to connect the required number of extra cables and extend them through the cable channel to the point nearest where it is to be connected to a machine or other device.

If, on the other hand, it is desired to make a connection with a machine or other device nearer to the connection device, it is merely necessary to disconnect the surplus cable lengths and store them away in the cable channel where they are out of sight and out of the way but ready for instant use when required again.

As shown in Fig. 4, the two flange members 10', 10' may be made unitary and connected by a flat bottom 10" which rests upon, extends across and is secured to the top of the main conduit 5. This form is preferable to the two-part channel in instances where greater rigidity is required.

In some cases, it may be desirable to partially or wholly cover the cable-way or channel with a top plate 16. The cable may be led out over the flanges 10 as shown in Figs. 1 and 2 or through the flanges or through the cover as shown in Fig. 3. The shape of the cover is immaterial to the present invention.

I claim:

1. A bus bar conduit system having a horizontal main duct with enclosed bus bars and external flanges secured to the main duct forming an open channel on top of the main duct, branch box connections connected to the bottom of the main duct and having terminal members detachably engaging bus bars within the duct and flexible cables connected with the branch box connections and supported at least in part in said channel, said channel being readily accessible from both sides of the duct.

2. A bus bar conduit system having a horizontal main duct with enclosed bus bars and flanges facing toward each other and forming an open channel on top of the main duct, branch boxes connected to the lower part of the main duct and having terminal members engaging the bus bars within the duct and flexible cables connected with the branch boxes and supported at least in part in said channel above the bus bars and leading to points for consumption of power.

3. A bus bar duct system including a housing with branch connectors, cables leading from said branch connectors and flanges secured to the housing and forming a channel or cable-way on top of the housing and cable clamps detachably carried by said flanges for supporting the cables between the branch connectors and the point of use of the current.

4. A bus bar duct system having a horizontal metallic duct for bus bars, oppositely disposed flanges at the upper edges of the duct forming an open top cable-way channel on top of the duct for containing flexible cable portions and means engaging said flanges for supporting said duct and the cable portions supported therein.

5. In an electric power distribution system the combination of a horizontal duct for bus bars, a connector box for branch circuits connected to said duct, a flexible cable leading from said box, means for securing a part of said cable to said duct, a laterally disposed guide for said cable and spring means for supporting said guide and said cable arranged approximately above the point where electric current from said cable is to be used.

6. In a bus bar duct system, a horizontal duct for the bus bars, flanges secured to the upper edges of the duct and forming between them above the duct a channel or cable-way, a branch connector box secured beneath the duct and having connections with the bus bars, a flexible cable leading from said box and having a portion of it supported in said cable-way and a cable-clamp secured at one side of said cable-way for supporting the cable at the side of said duct between the branch connector box and the point of use of the current from the bus bars in the duct.

7. In a bus bar duct system, a horizontal duct for the bus bars, flanges secured to the upper edges of the duct and forming between them above the duct a channel or cable-way, a branch connector box secured beneath the duct and having connections with the bus bars, a flexible cable leading from said box and having a portion of it supported in said cable-way and vertical rods connected to said flanges and supporting said duct and the branch connector box and cable.

ELMER T. CARLSON.